United States Patent
Nishino

(10) Patent No.: US 7,109,602 B2
(45) Date of Patent: Sep. 19, 2006

(54) CONTACTLESS POWER SUPPLY SYSTEM AND BRANCH BOX USED THEREFOR

(75) Inventor: Shuzo Nishino, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 446 days.

(21) Appl. No.: 10/398,634

(22) PCT Filed: Oct. 15, 2001

(86) PCT No.: PCT/JP01/09051

§ 371 (c)(1),
(2), (4) Date: Apr. 7, 2003

(87) PCT Pub. No.: WO02/37642

PCT Pub. Date: May 10, 2002

(65) Prior Publication Data

US 2004/0119340 A1    Jun. 24, 2004

(30) Foreign Application Priority Data

Nov. 6, 2000   (JP) .......................... 2000-336806

(51) Int. Cl.
   *H02J 3/00*   (2006.01)
(52) U.S. Cl. .................................. 307/17; 361/154
(58) Field of Classification Search ............. 307/17; 361/154
   See application file for complete search history.

(56) References Cited

U.S. PATENT DOCUMENTS 4,634,958 A * 1/1987 Cornwell .................... 323/255
4,833,338 A   5/1989 Bartlett et al. ............... 307/17
4,862,010 A * 8/1989 Yamamoto ................. 290/38 R
5,293,308 A * 3/1994 Boys et al. .................. 363/37
5,301,096 A * 4/1994 Klontz et al. ................ 363/37
5,619,078 A   4/1997 Boys et al. .................. 307/85
5,992,341 A * 11/1999 Gerhardt ................. 114/102.16
6,005,304 A * 12/1999 Seelig ........................ 307/104

FOREIGN PATENT DOCUMENTS

| JP | 45-39770 | 12/1970 |
| JP | 52-111624 | 9/1977 |
| JP | 7-87691 | 9/1993 |
| JP | 6-54403 | 2/1994 |
| JP | 6-205532 | 7/1994 |
| JP | 7-94266 | 4/1995 |
| JP | 11-27870 | 1/1999 |
| WO | WO 93/23909 | 11/1993 |

* cited by examiner

*Primary Examiner*—Robert Deberadinis
*Assistant Examiner*—Daniel Cavallari
(74) *Attorney, Agent, or Firm*—Kusner & Jaffe

(57) ABSTRACT

An arrangement comprising a magnetic body (12) having a hole portion (11) for passage of a primary-side first induction line (2), a primary-side second induction line (5) for electrically feeding a load in a contact less manner, an added line (17) passing through the hole portion (11) of the magnetic body, and 1th contact (19) for short-circuiting the added line 17. According to this arrangement, short-circuiting provided by the 1th contact (19) can cut off electric feeding to the primary-side second induction line (5), thereby isolating the load (second-side power receiving circuit) without mechanically switching the power supply line.

9 Claims, 4 Drawing Sheets

(a)

(b)

CONTACTLESS POWER SUPPLY SYSTEM AND BRANCH BOX USED THEREFOR

TECHNICAL FIELD

The present invention relates to a contactless power supply system wherein a primary-side induction line providing high frequency current feeds electric power to a secondary-side load in a contactless manner, and it also relates to a branch box used therefor.

BACKGROUND ART

Contact less power supply systems include one which feeds electric power to "a plurality of working areas" from a primary-side induction line providing high frequency current. In the working areas, for example, a travel carriage is fed with electric power from the primary-side induction line though a pickup coil in a contactless manner.

In the system for feeding electric power to the "plurality of working areas," it sometime becomes necessary, as at the time of maintenance of the working areas, to cut off the power supply for each working area. In such case, measures are taken by inserting a switching circuit in the primary-side induction line providing high frequency current, for each working area, and bypassing a within-working-area primary-side induction line led into the working area by means of the switching circuit when cutting off the power supply in the working area.

The switching circuit comprises a bypass circuit for bypassing the within-working-area primary-side induction line, and a switch adapted to switch to either the bypass circuit or the within-working-area primary-side induction line after the bypass circuit and the within-working-area primary-side induction line are simultaneously connected, whereby electric feeding to the other working areas being actuated is not cut off.

In the switching circuit, however, in order not to allow power to break down in the other working areas which are being actuated, it is necessary for the switch to ensure mechanical contact and contact duration in order for effecting simultaneous connection between the bypass circuit and the within-working-area primary-side induction line, and it is necessary, to this effect, to use a special and highly reliable switch. Further, if a power supply device is prepared for each of the working areas, such switching circuit can be dispensed with, but the cost becomes very high.

Further, when an lifting/lowering body, such as a crane, is fed with power from the primary-side induction line providing high frequency current, it is necessary that the primary-side induction line is capable of moving vertically in conformity with the lifting/lowering movement of the lifting/lowering body. To this end, the primary-side induction line is allowed to slack so as to be movable vertically in conformity with the lifting/lowering movement of the lifting/lowering body.

However, when the crane or other lifting/lowering body is fed with power from the primary-side induction line providing high frequency current, a wire breakage tends to occur in the primary-side induction line as the line repeats lifting/lowering movement with the lifting/lowering body. Thus, in order to avoid power breakdown occurring in all power supply lines due to such wire breakage, frequent maintenance is necessary.

DISCLOSURE OF THE INVENTION

It is an object of the invention to provide a contactless power supply system capable of solving these problems and partly cutting off power supplies to feeder areas without mechanically switching the power supply lines.

To achieve this object, the invention provides a contactless power supply system for feeding electric power from a primary-side induction line providing high frequency current to a secondary-side load in a contactless manner, characterized in that the primary-side induction line comprises a first induction line connected to a power supply device, at least one second induction line and a magnetic body for inductively coupling the first induction line and the second induction line, the contactless power supply system including an added line wound on the magnetic body, a switch means for short-circuiting the added line, and a start circuit connected together with the switch means in parallel to the added line, and adapted to raise a loaded current flowing through the second induction line with a predetermined time constant when the switch means is opened, thereby to prevent the magnetic body from becoming saturated due to difference between the current flowing through the primary-side induction line and the loaded current.

According to such arrangement, short-circuiting provided by the switch means can cut off electric feeding to the second induction line on the primary side, thereby safely performing maintenance of the load which is electrically fed in a contactless manner from the second induction line on the primary side. Further, since AT (ampere turn) flowing through the added line coincides with AT flowing through the first induction line, increasing the number of turns of the added line can reduce the current flowing through the switch means, allowing a more inexpensive switch means to be used. Further, since the start circuit is connected in parallel to the added line and current is supplied to flow through the added line only with the time constant set after the switch means is opened, the difference between the large current flowing through the primary-side induction line and the loaded current flowing through the second induction line on the secondary side is absorbed to minimize magnetomotive force applied to the magnetic body, whereby the magnetic body is prevented from becoming magnetically saturated. Consequently, the magnetic body can thereafter be used in its unsaturated state.

It is also an object of the invention to provide a branch box capable of reducing the number of times of maintenance in a contactless power supply system.

To achieve this object, the invention provides a branch box in which a primary-side induction line providing high frequency current comprises a first induction line connected to a power supply device and at least one second induction line for electrically feeding the load on the secondary side in a contactless manner, the branch box being used when the second induction line branches off from the first induction line, characterized in that the branch box includes a pair of first terminals to which the first induction line is connected, a pair of second terminals to which the second induction line is connected, a magnetic body, a first line wound on the magnetic body and connected to both ends of the first terminals, a second line wound on the magnetic body and connected to both ends of the second terminals, an added line wound on the magnetic body and a switch means for short-circuiting the added line.

According to such arrangement, the magnetic body allows the primary-side second induction line to be installed in a branched relation from the primary-side first induction line, so that even when the lifting/lowering body, such as crane, is electrically fed by the primary-side second induction line, the primary-side first induction line can be fixed by using the primary-side second induction line in a portion which repeats lifting and lowering. As a result, there is no danger of the primary-side induction line being broken by the lifting and lowering movement as before, and it becomes possible to reduce the number of times of maintenance intended to avoid power breakdown in the whole system caused by such wire breakage. Further, since the start circuit is connected in parallel to the added line and current is supplied to flow through the added line only with the time constant set after the switch means is opened, the difference between the large current flowing through the primary-side induction line and the loaded current flowing through the second induction line on the secondary side is absorbed to minimize magnetomotive force applied to the magnetic body, whereby the magnetic body is prevented from becoming magnetically saturated. Consequently, the magnetic body can thereafter be used in its unsaturated state.

BEST MODE OF EMBODYING THE INVENTION

Figure 1:
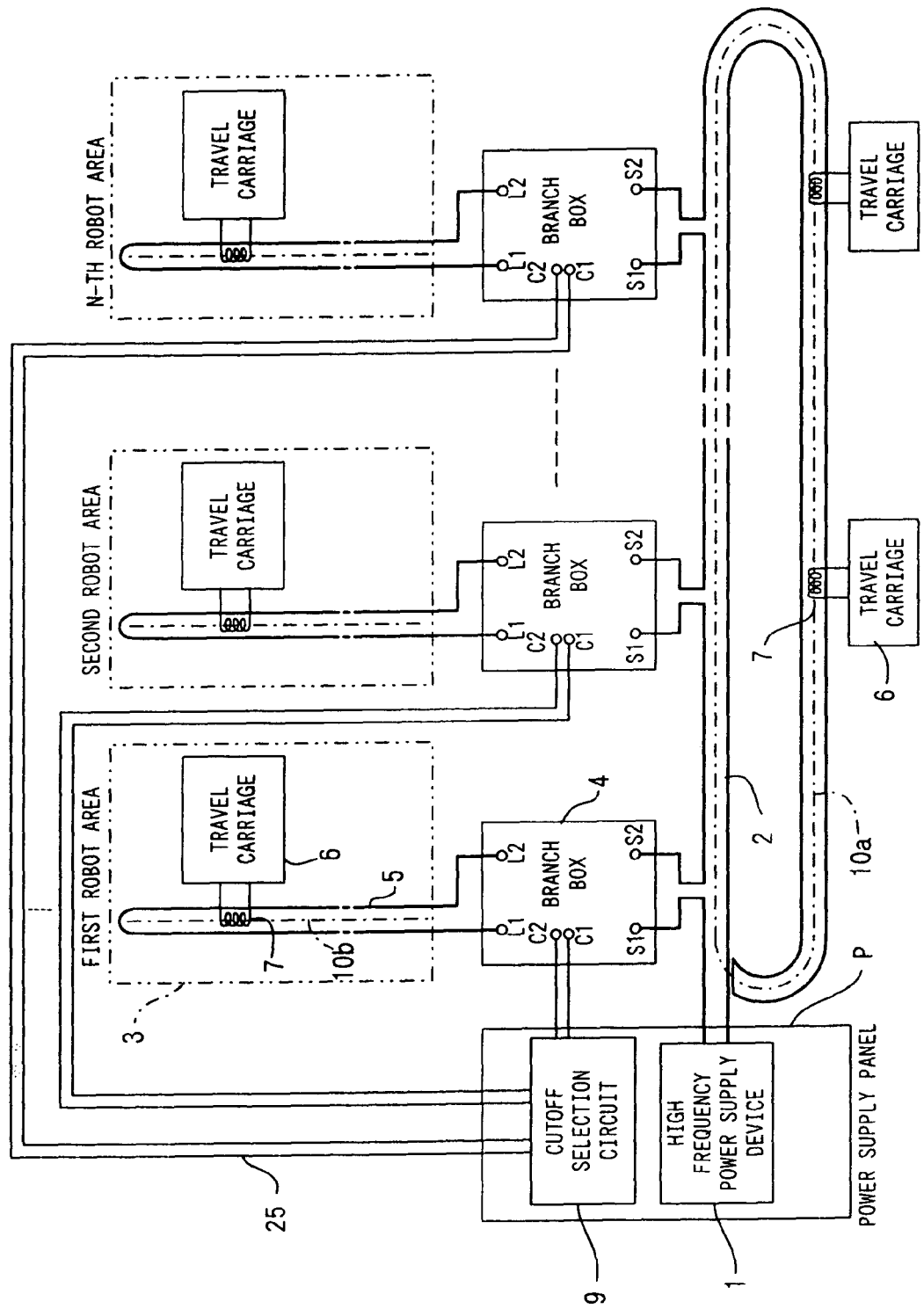
FIG. 1 is a circuit diagram of a contactless power supply system according to an embodiment of the invention.

In FIG. 1, the numeral 1 denotes a high frequency power supply device installed on a power supply panel P and adapted to feed a first induction line 2 on the primary side with high frequency current. The primary-side first induction line 2 is laid along N (plural) robot areas (an example of working area) 3. And branch boxes 4 are provided, one for each robot area 3. Each branch box 4 allows a secondary induction line 5 on the primary side for feeding electricity to robot area 3 to branch off from the primary-side first induction line 2.

In FIG. 1, the numeral 6 denotes a travel carriage (an example of load) fed with power from the primary-side first induction line 2 or the primary-side second induction line 5 in a contactless manner through a pickup coil 7. And the numeral 9 denotes a cutoff selection circuit (later described in more detail) installed on a power supply panel P for selecting electric feeding to each robot area 3 to cut off the electric feeding. The primary-side first induction line 2 is laid along the looped travel path 10a of travel carriages 6, while the primary-side second induction lines 5 are each laid along the linear travel path 10b of the travel carriage 6 in each robot area 3.

Figure 2:
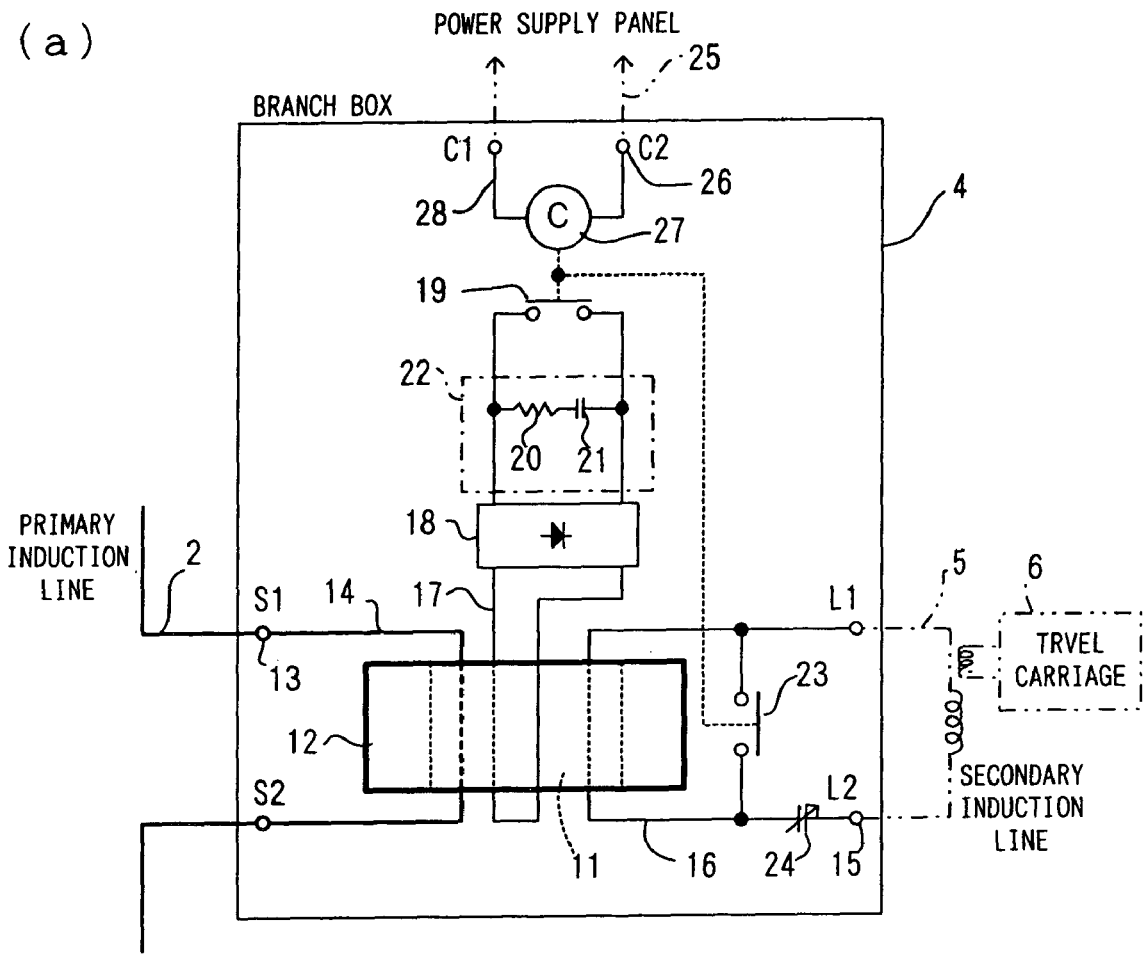
FIG. 2 is a circuit diagram of a branch box in the contactless power supply system.
Figure 2:
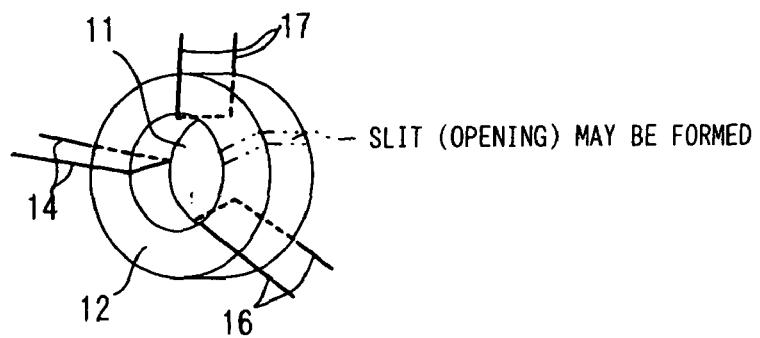

The branch box 4, as shown in FIG. 2, comprises an annular magnetic body 12 of ferrite having a hole portion in the form of a through or partly-opened through hole, a pair of input terminals 13 to which the primary-side first induction line 2 is connected, a first line 14 extending through the hole portion 11 of the magnetic body 12 and connected to both ends of the input terminals 13, a pair of output terminals 15 to which the primary-side second induction line 5 for electrically feeding the robot area 3 is connected, a second line 16 extending through the hole portion 11 of the magnetic body 12 and connected to both ends of the output terminals 15, an added line 17 extending through the hole portion 11 of the magnetic body 12, a rectifying circuit 18 connected to the added line 17, the 1th contact (an example of a first switch means) 19 of an electromagnetic contactor for short-circuiting the output ends of the rectifying circuit 18, a soft start circuit 22 connected to the output end of the rectifying circuit 18 in parallel relationship to the 1th contact 19 and consisting of a resistor 20 and a capacitor 21, of which time constant is 0.1–0.5 sec, the 2th contact (an example of second switch means) 23 of an electromagnetic contactor for short-circuiting the primary-side second induction line 5 (the second line 16), a tuning capacitor 24 interposed between one end of the 2th contact 23 and one output terminal 15, a pair of control terminals 26 to which a control line 25 connected to the cutoff selection circuit 9 in the power supply panel P is connected, the exciting coil 27 of an electromagnetic contactor, and a third line 28 connecting the exciting coil 27 of the electromagnetic contactor and the control terminal 26.

In addition, the capacitance C of the tuning capacitor 24 is set to resonate at the frequency f of the primary-side first induction line 2 according to the inductance L of the primary-side second induction line 5.

The operation of the embodiment described above will be described below using a first robot area 3 as an example.

(At the Time of Operation of First Robot Area 3)

When an operation using a robot is to be performed, no exciting signal to excite the exciting coil 27 of the electromagnetic contactor is sent from the cutoff selection circuit 9 in the power supply panel P to the branch box 4 in the first robot area 3. Thus, since the exciting coil 27 of the electromagnetic contactor is not excited, the contacts 19 and 23 of the electromagnetic contactor are opened.

In this state, when high frequency current is fed to the primary-side first induction line 2 (the first line 14), the primary-side second induction line 5 (the second line 16) is fed with electricity through the magnetic body 12 by magnetic flux produced by the primary-side first induction line 2 (the first line 14) since the contacts 19 and 23 of the electromagnetic contactor are opened. At this time, it is to be understood that the capacitor 21 of the start circuit 22 on the third added line 17 side has been charged.

In this state, the travel carriage 6 is fed from the primary-side second induction line 5 through the pickup coil 7, so that the travel carriage 6 travels and the operation is performed by the robot.

(At the Time of Maintenance of First Robot Area 3)

When maintenance is to be performed in the first robot area 3, an exciting signal to excite the exciting coil 27 of the electromagnetic contactor is sent from the cutoff selection circuit 9 in the power supply panel P to the branch box 4 in the first robot area 3. Thereupon, the exciting coil 27 of the electromagnetic contactor is excited and the contacts 19 and 23 of the electromagnetic contactor are closed, whereby the primary-side second induction line 5 (the second line 16) and the added line 17 are short-circuited, cutting off the electric feeding to the primary-side second induction line 5.

In this state, since the travel carriage 6 is not being fed with electricity from the primary-side second induction line 5, maintenance or the like of the first robot area 3 can be freely made. At this time, the electric charge stored in the capacitor 21 of the tertiary-side start circuit 22 is consumed by the resistor 20.

Next, when the maintenance in the first robot area 3 is completed, the exciting signal is turned off. Thereupon, the contacts 19 and 23 of the electromagnetic contactor opened. At this time, at first current flows through the start circuit 22 (in the tertiary side of the magnetic body 12) to charge the capacitor 21, and the time constant of this start circuit 22 causes the current (the current in the second side of the magnetic body 12) to gradually increase, with the result that the magnetic body 12 becomes activated with unsaturated current. Therefore, the magnetic body 12 can thereafter be used in its unsaturated state.

In addition, if the start circuit 22 is absent, the current value of the primary-side first induction line 2 would be too large for the current to completely flow from the magnetic body 12 into the primary-side second induction line 5 (the second line 16) when the contacts 19 and 23 are opened, with the result that the magnetic body 12 becomes saturated. Once it is saturated, the operation is thereafter allowed only at the saturated point.

Thus, the first robot area 3 can be electrically isolated without mechanically switching the power supply line as in the conventional switch in the switching circuit and hence the number of time of maintenance required for the conventional switching circuit can be reduced. Further, the 2th contact (the second switch means) 23 of the electromagnetic contactor directly cuts off the electric feeding of the primary-side second induction line 5, resulting in double cutoff by the 1th contact (the first switch means) 19 of the electromagnetic contactor in the added line 17 and by the 2th contact 23 of the electromagnetic contactor, thus ensuring high reliability.

The branch box 4 allows the primary-side second induction line 5 to be installed in branch relationship to the primary-side first induction line 2, so that even when the lifting/lowering body, such as crane, is fed with electricity by the primary-side second induction line 5, the primary-side first induction line 2 can be fixed by using the primary-side second induction line 5 in the portion which repeats lifting and lowering. Therefore, there is no danger of the primary-side induction line being broken by the lifting and lowering movement as before, and it becomes possible to reduce the number of times of maintenance which has been required by the conventional switching circuit.

If a reserve branch box 4 is installed in advance, construction work for increasing the number of robots can be performed without performing construction work for the power supply line (the primary-side first induction line 2); thus additional work can be quickly and safely performed. This is very effective particularly when robots are to be increased in number successively at time intervals, such as first-term work, second-term work, and so on.

Using the rectifying circuit 18 for conversion into dc current and connecting the start circuit 22 allows a dc capacitor to be used as the capacitor 21; thus, a capacitor, which is very inexpensive and small-sized as compared with an ac capacitor, can be used. As a result, the branch box 4 can be produced at low cost. Further, since the AT (ampere-turn) flowing through the added line 17 coincides with the AT flowing through the first induction line 14, increasing the number of turns of the added line 17 wound on the magnetic body 12 allows the current flowing through the 1th contact (the switch means) 19 of the electromagnetic contactor to be reduced, allowing a further inexpensive electromagnetic contactor to be used.

Since the primary-side first induction line 2 and the primary-side second induction line 5 are electrically isolated, there is no danger of an abnormal voltage being applied to the high frequency power supply device 1 feeding electricity to the primary-side first induction line 2 even if an accident happens in the primary-side second induction line 5; thus, the high frequency power supply device 1 can be protected from breakdown.

Since the output power of the primary-side second induction line 5 can be determined by the cross-sectional area and physical properties of the magnetic body 12 driving the primary-side second induction line 5 and the number of turns of the second induction line 5 (second line 16) wound on the magnetic body 12, the power that can be fed to the robot area 3, that is, to the electric feed area can be restricted; thus, it can be used as a protective circuit. Similarly, if the output power associated with the magnetic body 12 is made sufficiently smaller than the power capacity of the high frequency power supply device 1, electric feeding to the primary-side first induction line 2 by the high frequency power supply device 1 can be stably effected even when a wire breakage occurs in the primary-side second induction line 5, since the magnetic body 12 becomes saturated.

ANOTHER MODES OF EMBODYING THE INVENTION

Another modes of embodying the invention will now be described.

(Another Embodiment 1)

Figure 3:
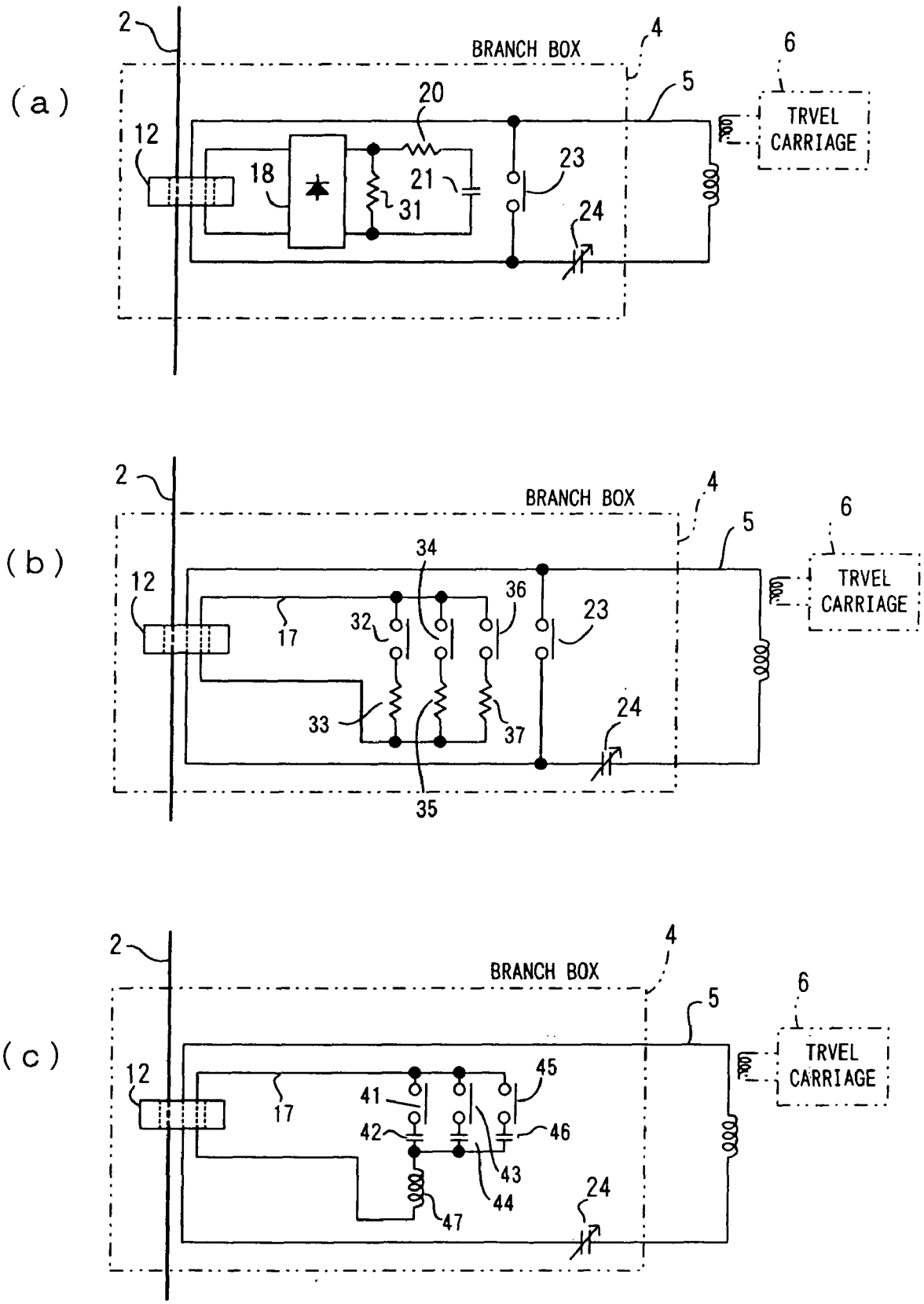
FIG. 3 is a circuit diagram of a contactless power supply system according to another embodiment of the invention.

As shown in FIG. 3(a), in the branch box 4, the 1th contact 19 is replaced by a resistor 31 having a very high resistance value. In addition, the circuit of the exciting coil 27 is omitted from FIG. 3(a).

The operation of this arrangement will now be described. In addition, it is to be understood that the 2th contact 23 is opened and that the primary-side second induction line 5 (the second line 16) is being fed by the magnetic flux produced by the primary-side first induction line 2 (the first line 14). It is to be understood that at this time, the capacitor 21 of the start circuit 22 on the tertiary side has been charged.

In this state, the travel carriage 6 is fed with electricity from the primary-side second induction line 5 and a robot operation is performed.

When maintenance is performed in the first robot area 3, an exciting signal is sent from the cutoff selection circuit 9 in the power supply panel P to the branch box 4 of the first robot area 3 to excite the exciting coil 27 of the electromagnetic contactor. Thereupon, the exciting coil 27 of the electromagnetic contactor is excited to cause the 2th contact 23 of the electromagnetic contactor to close, so that the primary-side second induction line 5 (the second line 16) is short-circuited. In this state, since the travel carriage 6 is not fed from the primary-side second induction line 5, maintenance or the like for the travel carriage 6 can be freely performed. At this time, the electric charge stored in the capacitor 21 of the start circuit 22 on the tertiary side is consumed by the resistors 20 and 31.

Then, when the maintenance is completed in the first robot area 3, the exciting signal is turned off. Thereupon, the 2th contact 23 of the electromagnetic contactor opened. At this time, at first current flows through the start circuit 22 (on the tertiary side) to charge the capacitor 21, with the current (the current in the secondary side of the magnetic body 12) gradually increasing according to the time constant of the start circuit 22, so that the magnetic body 12 becomes activated with unsaturated current. Therefore, the magnetic body 12 can thereafter be used in its unsaturated state.

Thus, in another embodiment 1, too, the robot area 3 can be electrically isolated without mechanically switching the power supply line as in the switch of the conventional switching circuit, so that it becomes possible to reduce the number of times of maintenance which has been required by the conventional switching circuit.

(Another Embodiment 2)

As shown in FIG. 3(b), in the branch box 4, the rectifying circuit 18, the 1th contact 19 and the start circuit 22 are replaced by a first series circuit consisting of contact 32 and a resistor 33, a second series circuit consisting of contact 34 and a resistor 35, and a third series circuit consisting of contact 36 and a resistor 37, these circuits being connected in parallel to the added line 17. In addition, the exciting coils 27 and the circuits of the exciting coils for the contacts 32, 34, and 36 are omitted from FIG. 3(b).

During the maintenance of the robot area, the contacts 32, 34, and 36 and the 2th contact 23 are all closed. When the maintenance is completed and electric feeding is started, the 2th contact 23 is opened and the contacts 32, 34, and 36 are successively opened at time intervals.

According to this arrangement, when electric feeding is started, at first current flows through the parallel-connected resistors 33, 35, and 37 on the tertiary side, and the contacts 32, 34, and 36 are successively opened at time intervals. Each time the contact is opened, the total resistance on the tertiary side increase while the current in the tertiary side decreases, so that the current (the current in the secondary side of the magnetic body 12) gradually increases, with the result that the magnetic body 12 becomes activated with unsaturated current. Therefore, the magnetic body 12 can thereafter be used in its unsaturated state.

Thus, in another embodiment 2, too, the robot area 3 can be electrically isolated without mechanically switching the power supply line as in the switch of the conventional switching circuit, so that it becomes possible to reduce the number of times of maintenance required by the conventional switching circuit.

(Another Embodiment 3)

As shown in FIG. 3(c), in the branch box 4, the 2th contact 23 is eliminated, and the rectifying circuit 17, the 1th contact 19 and the start circuit 22 are replaced by a parallel combination of a first series circuit consisting of contact 41 and a capacitor 42, a second series circuit consisting of contact 43 and a capacitor 44, and a third series circuit consisting of contact 45 and a capacitor 46, with a coil 47 connected in series to this parallel combination, the entire circuit being connected to the added line 17. Further, the total capacitance of the capacitors 42, 44, and 46 and the inductance of the coil 47 are selected such that the circuit resonates at the frequency of the primary-side first induction line 2. In addition, the circuits of the exciting coils for these a contacts 41, 43, and 45 are omitted from FIG. 3(c).

During the maintenance of the robot area, the contacts 41, 43, and 45 are all closed. When the maintenance is completed and electric feeding is started, the contacts 41, 43, and 45 are successively opened at time intervals.

According to this arrangement, since at first the parallel-connected capacitors 42, 44, and 46 on the tertiary side and the coil 47 are resonating at the frequency of the primary-side first induction line 2, the impedance of the added line 17 is "0" and short-circuit current flows through the added line 17, so that the travel carriage 6 in the robot area is not fed with electricity. And, each time one of the contacts 41, 43, and 45, which are opened successively at time intervals, is opened, the capacitance decreases. As the added line 17 is gradually departing away from its resonance state, the impedance increases; thus, the tertiary-side current decreases, so that the current (the current in the secondary side of the magnetic body 12) gradually increases and the magnetic body 12 becomes activated with unsaturated current. Therefore, the magnetic body 12 can thereafter be used in its unsaturated state.

Thus, in another embodiment 3, too, the first robot area 3 can be electrically isolated without mechanically switching the power supply line as in the switch of the conventional switching circuit, so that it becomes possible to reduce the number of times of maintenance which has been required by the conventional switching circuit.

(Another Embodiment 4)

Figure 4:
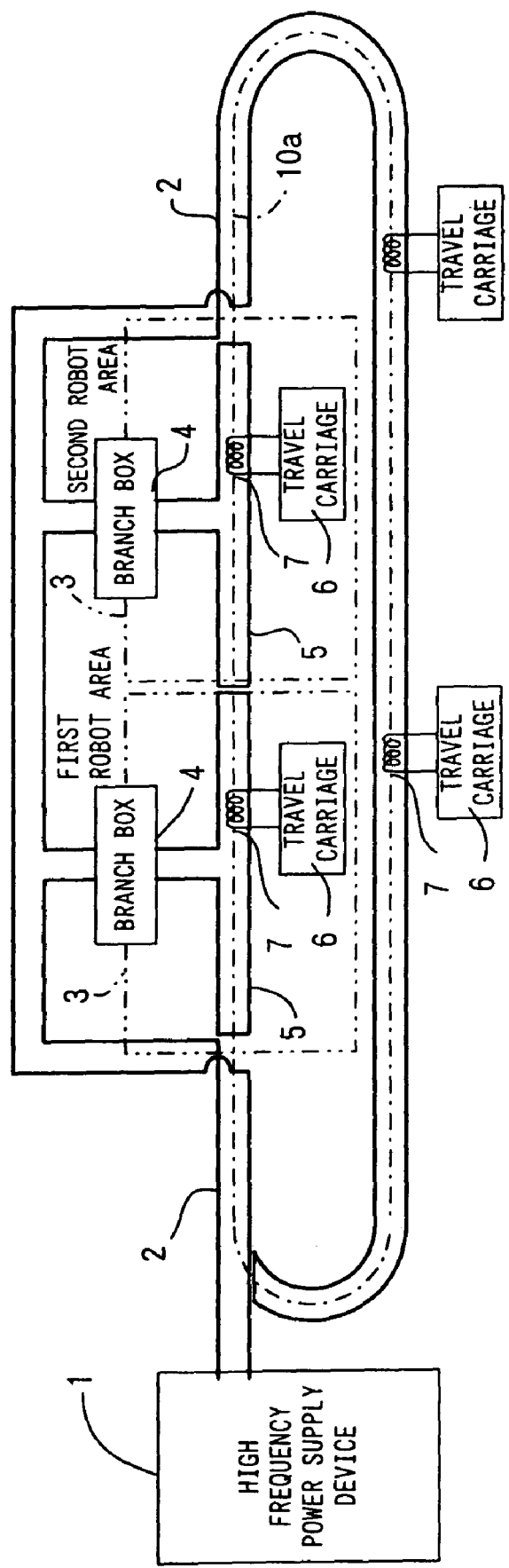
FIG. 4 is a circuit diagram of a contactless power supply system according to still another embodiment of the invention.

In the contactless power supply system shown in FIG. 1, the second induction line 5 on the primary side is laid in another area (robot area 3) separate from the area in which the first induction line 2 on the primary side is laid, whereas in another embodiment 4, as shown in FIG. 4, the primary-side first induction line 2 and the primary-side second induction line 5 which is branched off, at the branch box 4, from the primary-side first induction line 2 are continuously laid along a loop-like travel path 10a for the travel carriage 6, thereby forming a feeder line for the travel carriage 6.

According to this arrangement, the branch box 4 allows maintenance to be performed by cutting off electric feeding only to a given section of the loop-like travel path 10a fed with electricity from the primary-side second induction line 5, while continuing electric feeding to the other sections.

The invention claimed is:

1. A contactless power supply system for feeding electric power from a primary-side induction line providing high frequency current to a secondary-side travel carriage in a contactless manner, characterized in that
the primary-side induction line comprises:
a first induction line connected to a power supply device and feeding electric power to the travel carriage in a contactless manner;
at least one second induction line for feeding electric power to the travel carriage in a contactless manner; and
a magnetic body for inductively coupling the first induction line and the second induction line,
the contactless power supply system including:
an added line wound on the magnetic body;
a switch means for short-circuiting the added line; and
a start circuit connected together with the switch means in parallel to the added line, and adapted to raise a loaded current flowing through the second induction line with a predetermined time constant when the switch means is opened, thereby to prevent the magnetic body from becoming saturated due to difference between the current flowing through the primary-side induction line and the loaded current.

2. A contactless power supply system for feeding electric power from a primary-side induction line providing high frequency current to a secondary-side travel carriage in a contactless manner, characterized in that
the primary-side induction line comprises:
a first induction line connected to a power supply device and feeding electric power to the travel carriage in a contactless manner;
at least one second induction line for feeding electric power to the travel carriage in a contactless manner; and
a magnetic body for inductively coupling the first induction line and the second induction line,
the contactless power supply system including:
an added line wound on the magnetic body;
a rectifying circuit connected to the added line;
a first switch means for short-circuiting output ends of the rectifying circuit;
a second switch means for short-circuiting the second induction line; and
a start circuit connected together with the first switch means in parallel to the added output ends of the rectifying circuit, and adapted to raise a loaded current flowing through the second induction line with a predetermined time constant when the first and second switch means is opened, thereby to prevent the magnetic body from becoming saturated due to difference between the current flowing through the primary-side induction line and the loaded current.

3. A contactless power supply system for feeding electric power from a primary-side induction line providing high frequency current to a secondary-side travel carriage in a contactless manner, characterized in that the primary-side induction line comprises:
a first induction line connected to a power supply device and feeding electric power to the travel carriage in a contactless manner;
at least one second induction line for feeding electric power to the travel carriage in a contactless manner; and
a magnetic body for inductively coupling the first induction line and the second induction line,
the contactless power supply system including:
an added line wound on the magnetic body;
a rectifying circuit connected to the added line;
a resistor connected to output ends of the rectifying circuit;
a switch means for short-circuiting the second induction line; and
a start circuit connected together with the resistor in parallel to the added output ends of the rectifying circuit, and adapted to raise a loaded current flowing through the second induction line with a predetermined time constant when the switch means is opened, thereby to prevent the magnetic body from becoming saturated due to difference between the current flowing through the primary-side induction line and the loaded current.

4. A contactless power supply system for feeding electric power from a primary-side induction line providing high frequency current to a secondary-side travel carriage in a contactless manner, characterized in that the primary-side induction line comprises:
a first induction line connected to a power supply device and feeding electric power to the travel carriage in a contactless manner;
at least one second induction line for feeding electric power to the travel carriage in a contactless manner; and
a magnetic body for inductively coupling the first induction line and the second induction line,
the contactless power supply system including:
an added line wound on the magnetic body;
a plurality of series circuits connected in parallel to the added line, each circuit comprising a first switch means and a resistor; and
a second switch means for short-circuiting the second induction line,
wherein when the second switch means is opened, the first switch means in the series circuits are opened successively at time intervals, thereby to prevent the magnetic body from becoming saturated due to difference between the current flowing through the primary-side induction line and loaded current flowing through the secondary induction line.

5. A branch box in which a primary-side induction line providing high frequency current comprises a first induction line connected to a power supply device and feeding electric power to the travel carriage in a contactless manner, and at least one second induction line for feeding electric power to the travel carriage in a contactless manner, the branch box being used when the second induction line branches off from the first induction line, characterized in that the branch box includes:
a pair of first terminals to which the first induction line is connected;
a pair of second terminals to which the second induction line is connected;
a magnetic body made of ferrite and having a hole portion in a form of a through or partly-opened through hole;
a first line extending through the hole portion of the magnetic body and connected to both ends of the first terminals;
a second line extending through the hole portion of the magnetic body and connected to both ends of the second terminals;
an added line extending through the hole portion of the magnetic body;
a rectifying circuit connected to the added line;
a first switch means for short-circuiting output ends of the rectifying circuit;
a second switch means for short-circuiting the second line;
a pair of third terminals;
an electromagnetic contactor having an electromagnetic coil connected to the third terminals; and
a start circuit connected together with the first switch means in parallel to the rectifying circuit, and adapted to raise a loaded current flowing through the second induction line with a predetermined time constant when the first switch means and the second switch means are opened, thereby to prevent the magnetic body from becoming saturated due to difference between the current flowing through the primary-side induction line and the loaded current, wherein
the first and second switch means are composed of contacts of the electromagnetic contactor, the third terminals are connected to the power supply device, and the electromagnetic contactor is excited by the power supply device through the third terminals.

6. The contactless power supply system according to claim 1, wherein the magnetic body is made of ferrite of an annular shape having a hole portion in the form of a through hole, and the first induction line, the second induction line and the added line extend through the hole portion of the magnetic body.

7. The contactless power supply system according to claim 2, wherein the magnetic body is made of ferrite of an annular shape having a hole portion in the form of a through hole, and the first induction line, the second induction line and the added line extend through the hole portion of the magnetic body.

8. The contactless power supply system according to claim 3, wherein the magnetic body is made of ferrite of an annular shape having a hole portion in the form of a through hole, and the first induction line, the second induction line and the added line extend through the hole portion of the magnetic body.

9. The contactless power supply system according to claim 4, wherein the magnetic body is made of ferrite of an annular shape having a hole portion in the form of a through hole, and the first induction line, the second induction line and the added line extend through the hole portion of the magnetic body.

* * * * *